Figure 1:
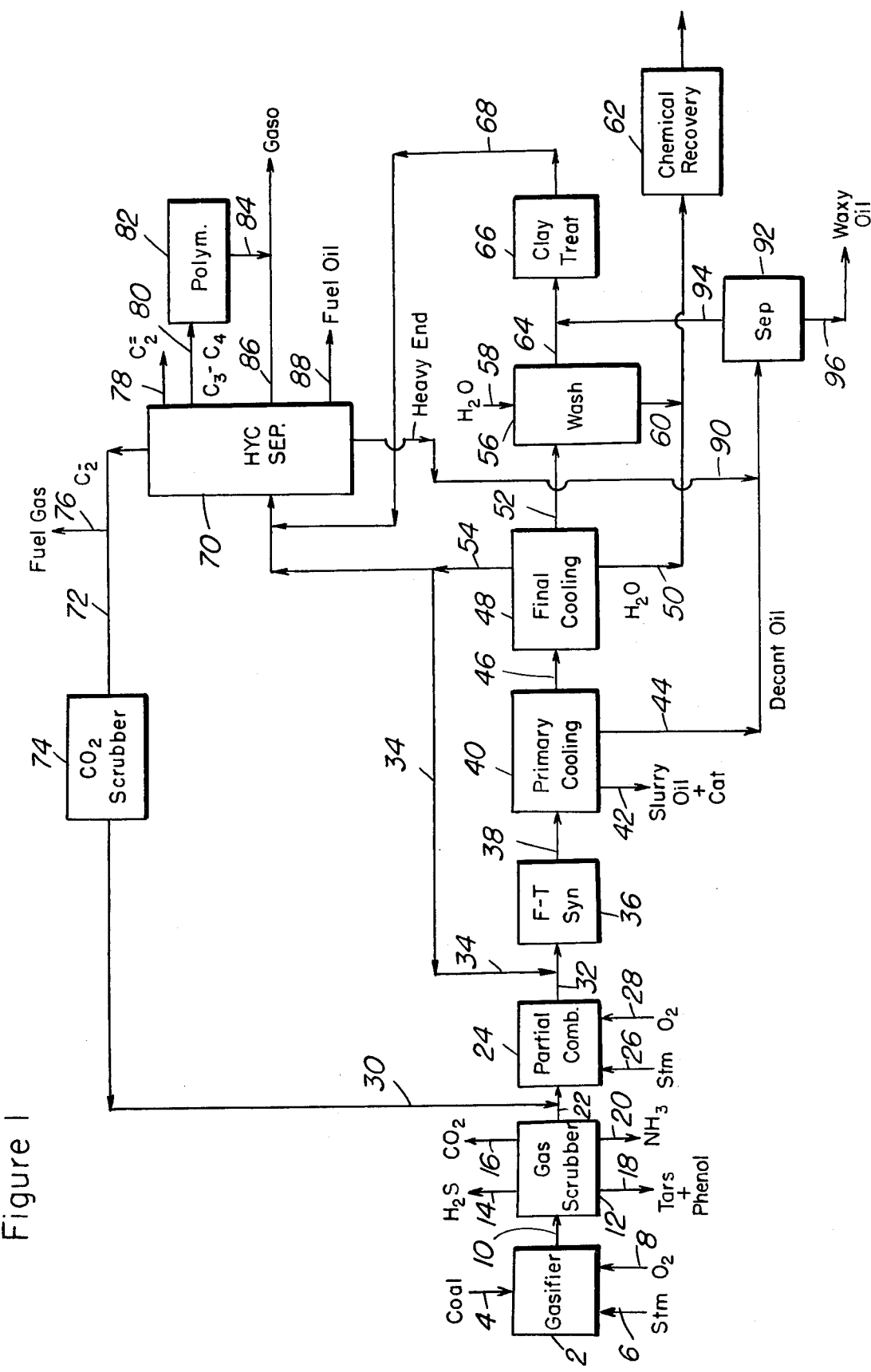

United States Patent [19]

Kuo et al.

[11] 4,049,741
[45] Sept. 20, 1977

[54] METHOD FOR UPGRADING FISCHER-TROPSCH SYNTHESIS PRODUCTS

[75] Inventors: James C. Kuo, Cherry Hill; Charles D. Prater, Pitman, both of N.J.; John J. Wise, Media, Pa.

[73] Assignee: Mobil Oil Corporation, New York, N.Y.

[21] Appl. No.: 614,584

[22] Filed: Sept. 18, 1975

[51] Int. Cl.² .............................................. C07C 1/04
[52] U.S. Cl. ............................... 260/676 R; 208/79; 208/88; 208/93; 208/120; 208/135; 260/449 R; 260/450
[58] Field of Search .......... 260/676 R, 449 R, 449 M, 260/449.5, 449.6, 450; 208/57, 64, 79, 88, 93

[56] References Cited

U.S. PATENT DOCUMENTS

| | | | |
|---|---|---|---|
| 2,740,804 | 4/1956 | Glazier | 260/450 |
| 2,752,382 | 6/1956 | Garrett et al. | 260/450 |
| 3,172,842 | 3/1965 | Paterson | 208/79 |
| 3,700,585 | 10/1972 | Chen et al. | 208/111 |
| 3,729,409 | 4/1973 | Chen | 208/135 |
| 3,760,024 | 9/1973 | Cattanach | 260/673 |
| 3,843,510 | 10/1974 | Morrison et al. | 208/111 |
| 3,928,483 | 12/1975 | Chang et al. | 260/668 R |
| 3,960,978 | 6/1976 | Givens et al. | 260/683.15 R |

OTHER PUBLICATIONS

Asinger, Paraffins Chemistry & Technology, Pergammon Press, N.Y. (1968), pp. 3, 123–125, 131, 132, 136, 138.

*Primary Examiner*—C. Davis
*Attorney, Agent, or Firm*—Charles A. Huggett; Carl D. Farnsworth

[57] ABSTRACT

The products of Fischer-Tropsch synthesis boiling below a separated decant oil fraction are subjected to cooling to a temperature of about 100° F and separation of the cooled product to recover Fischer-Tropsch produced water comprising oxygenates, a normally liquid hydrocarbon phase comprising absorbed oxygenates and a gaseous phase normally comprising a substantial amount of $C_5$ hydrocarbons in combination with lower boiling materials including unreacted synthesis gas and carbon dioxide. Each of said gaseous phase and said normally liquid hydrocarbon phase are thereafter contacted with a selected crystalline zeolite catalyst particularly selective for the formation of gasoline boiling material of high octane.

6 Claims, 2 Drawing Figures

Figure II
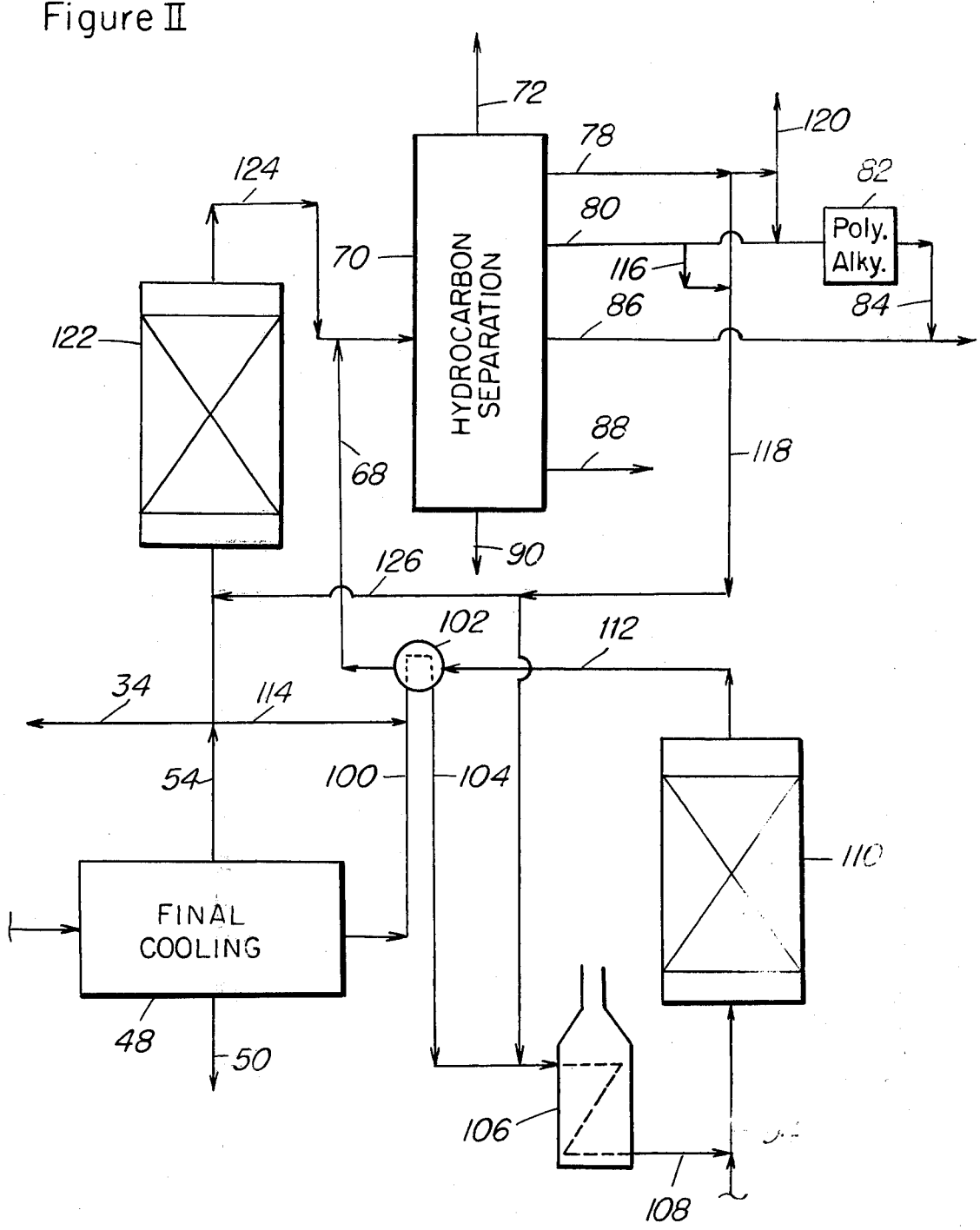

METHOD FOR UPGRADING FISCHER-TROPSCH SYNTHESIS PRODUCTS

BACKGROUND OF THE INVENTION

1. Field of the Invention

This invention is concerned with a process for converting synthesis gas, i.e., mixtures of gaseous carbon oxides with hydrogen or hydrogen donors, to hydrocarbon mixtures and oxygenates. In one aspect, this invention is concerned with process for increasing the field of hydrocarbon mixtures rich in aromatic hydrocarbons over that obtained in a known Fischer-Tropsch Synthesis process. In still another aspect, this invention is concerned with providing a novel catalyst for improving the products obtained by the conversion of synthesis gas over the prior art catalysts.

2. Other Prior Art

Processes for the conversion of coal and other hydrocarbons such as natural gas to a gaseous mixture consisting essentially of hydrogen and carbon monoxide, or of hydrogen and carbon dioxide, or of hydrogen and carbon monoxide and carbon dioxide, are well known. Although various processes may be employed for the gasification, those of major importance depend either on the partial combustion of the fuel with an oxygen-containing gas or on a combination of these two reactions. An excellent summary of the art of gas manufacture, including synthesis gas, from solid and liquid fuels, is given in Encyclopedia of Chemical Technology, Edited by Kirk-Othermer, Second Edition, Volume 10, pages 353-433, (1966), Interscience Publishers, New York, New York, the contents of which are herein incorporated by reference. The techniques for gasification of coal or other solid, liquid or gaseous fuel are not considered to be per se inventive here.

It is considered desirable to effectively and more efficiently convert synthesis gas, and thereby coal and natural gas, to highly valued hydrocarbons such as motor gasoline with high octane number, petrochemical feedstocks, liquefiable petroleum fuel gas, and aromatic hydrocarbons. It is well known that synthesis gas will undergo conversion to form reduction products of carbon monoxide, such as hydrocarbons, at from about 300° F to about 850° F under from about one to one thousand atmospheres pressure, over a fairly wide variety of catalysts. The Fischer-Tropsch process, for example, which has been most extensively studied, produces a range of products including liquid hydrocarbons, a portion of which have been used as low octane gasoline. The types of catalysts that have been studied for this and related processes include those based on metals or oxides of iron, cobalt, nickel, ruthenium, thorium, rhodium and osmium.

The wide range of catalysts and catalysts modifications disclosed in the art and an equally wide range of conversion conditions for the reduction of carbon monoxide by hydrogen provide considerable flexibility toward obtaining selected boiling-range products. Nonetheless, in spite of this flexibility, it has not proved possible to make such selections so as to produce liquid hydrocarbons in the gasoline boiling range which contain highly branched paraffins and substantial quantities of aromatic hydrocarbons, both of which are required for high quality gasoline, or to selectively produce aromatic hydrocarbons particularly rich in the benzene to xylenes range. A review of the status of this art is given in "Carbon Monoxide-Hydrogen Reactions", Encyclopedia of Chemical Technology, Edited by Kirk-Othmer, Second Edition, Volume 4, pp. 446-488, Interscience Publishers, New York, N.Y., the text of which is incorporated herein by reference.

Recently, it has been discovered that synthesis gas may be converted to oxygenated organic compounds and these then converted to higher hydrocarbons, particularly high octane gasoline, by catalytic contact of the synthesis gas with a carbon monoxide reduction catalyst followed by contacting the conversion products so produced with a special class of crystalline zeolite catalyst in a separate reaction zone. This two-stage conversion is described in a copending U.S. patent application, Ser. No. 387,220, filed on Aug. 9, 1973. Compositions of iron, cobalt or nickel deposited in the inner absorption regions of crystalline zeolites are described in U.S. Pat. No. 3,013,990. Attempts to convert synthesis gas over X-zeolite base exchanged with iron, cobalt and nickel are described in Erdol and Kohle — Erdgas, Petrochemie: Brennstoff — Chemie, Vol. 25, No. 4, pp. 187-188, April 1972.

SUMMARY OF THE INVENTION

This invention is concerned with improving the product distribution and yield of products obtained by a Fischer-Tropsch synthesis gas conversion process. In a particular aspect, the present invention is concerned with improving the product yield, product distribution and operating economies of a synthesis gas conversion operation known in the industry as the Sasol Synthol process.

The Sasol process located in South Africa and built to convert an abundant supply of poor quality coal and products thereof to particularly hydrocarbons, oxygenates and chemical forming components was a pioneering venture. The process complex developed is enormous, expensive to operate and may be conveniently divided or separated into (1) a synthesis gas preparation complex from coal, (2) a Fischer-Tropsch type of synthesis gas conversion in both a fixed catalyst bed operation and a fluid catalyst bed operation, (3) a product recovery operation and (4) auxillary plant and utility operations required in such a complex.

The extremely diverse nature of the products obtained in the combination operation of the Sasol process amplifies the complexity of the overall process complex, its product recovery arrangement and its operating economics. The Sasol synthesis operation is known to produce a wide spectrum of products including fuel gas, light olefins, LPG, gasoline, light and heavy fuel oils, waxy oils and oxygenates identified as alcohols, acetone, ketones and acids particularly acetic and proprionic acid. The $C_2$ and lower boiling components may be reformed to carbon monoxide and hydrogen or the $C_2$ formed hydrocarbons and methane may be combined and blended for use in a fuel gas pipeline system.

In the Sasol operation, the water soluble chemicals are recovered as by steam stripping distillation and separated into individual components with the formed organic acids remaining in the water phase separately treated. Propylene and butylene formed in the process are converted to gasoline boiling components as by polymerization in the presence of a phosphoric acid catalyst and by alkylation. Propane and butane on the other hand are used for LPG.

The present invention is concerned with improving a Fischer-Tropsch synthesis gas conversion operation and is particularly directed to improving the synthetic gasoline and light oil product selectivity and quality obtained by processing C₅ plus material over a special class of crystalline zeolite represented by ZSM5 crystalline zeolite. More particularly, the present invention is concerned with improving the product selectivity of a Fischer-Tropsch syngas conversion operation.

The special zeolite catalysts referred to herein utilize members of a special class of zeolites exhibiting some unusual properties. These zeolites induce profound transformations of aliphatic hydrocarbons to aromatic hydrocarbons in commercially desirable yields and are generally highly effective in alkylation, isomerization, disproportionation and other reactions involving aromatic hydrocarbons. Although they have unusually low alumina contents, i.e. high silica to alumina ratios, they are very active even with silica to alumina ratios exceeding 30. This activity is surprising since catalytic activity of zeolites is generally attributed to framework aluminum atoms and cations associated with these aluminum atoms. These zeolites retain their crystallinity for long periods in spite of the presence of steam even at high temperatures which induce irreversible collapse of the crystal framework of other zeolites, e.g. of the X and A type. Furthermore, carbonaceous deposits, when formed, may be removed by burning at higher than usual temperatures to restore activity. In many environments, the zeolites of this class exhibit very low coke forming capability, conducive to very long times on stream between burning regenerations.

An important characteristic of the crystal structure of this class of zeolites is that it provides constrained access to, and egress from, the intra-crystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred zeolites useful as catalysts in this invention possess, in combination: a silica to alumina ratio of at least about 12; and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in the binder or in cationic or other form within the channels. Although zeolites with a silica to alumina ratio of at least 12 are useful, it is preferred to use zeolites having higher ratios of at least about 30. Such zeolites, after activation, acquire an intracrystalline sorption capacity for normal hexane which is greater than that for water, i.e. they exhibit "hydrophobic" properties. It is believed that this hydrophobic character is advantageous in the present invention.

The zeolites useful as catalysts in this invention freely sorb normal hexane and have a pore dimension greater than about 5 Angstroms. In addition, their structure must provide constrained access to some larger molecules. It is sometimes possible to judge from a known crystal structure whether such constrained access exists. For example, if the only pore windows in a crystal are formed by 8-membered rings of oxygen atoms, then access by molecules of larger cross-section than normal hexane is substantially excluded and the zeolite is not of the desired type. Zeolites with windows of 10-membered rings are preferred, although excessive puckering or pore blockage may render these zeolites substantially ineffective. Zeolites with windows of twelve-membered rings do not generally appear to offer sufficient constraint to produce the advantageous conversions desired in the instant invention, although structures can be conceived, due to pore blockage or other cause, that may be operative.

Rather than attempt to judge from crystal structure whether or not a zeolite possesses the necessary constrained access, a simple determination of the "constraint index" may be made by continuously passing a mixture of equal weight of normal hexane and 3-methylpentane over a small sample, approximately 1 gram or less, of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F for at least 15 minutes. The zeolite is then flushed with helium and the temperature adjusted between 550° F and 950° F to give an overall conversion between 10% and 60%. The mixture of hydrocarbons is passed at 1 liquid hourly space velocity (i.e., 1 volume of liquid hydrocarbon per volume of catalyst per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10} (\text{fraction of n-hexane remaining})}{\log_{10} (\text{fraction of 3-methylpentane remaining})}$$

The constraint index approximates the ratio of the cracking rate constants for the two hydrocarbons. Catalysts suitable for the present invention are those which employ a zeolite having a constraint index from 1.0 to 12.0. Constraint Index (CI) values for some typical zeolites including some not within the scope of this invention are:

| CAS | C.I. |
|---|---|
| ZSM-5 | 8.3 |
| ZSM-11 | 8.7 |
| ZSM-35 | 4.5 |
| TMA Offretite | 3.7 |
| ZSM-12 | 2 |
| ZSM-38 | 2 |
| Beta | 0.6 |
| ZSM-4 | 0.5 |
| Acid Mordenite | 0.5 |
| REY | 0.4 |
| Amorphous Silica-alumina | 0.6 |
| Erionite | 38 |

The above-described Constraint Index is an important and even critical, definition of those zeolites which are useful to catalyze the instant process. The very nature of this parameter and the recited technique by which it is determined, however, admit of the possibility that a given zeolite can be tested under somewhat different conditions and thereby have different constraint indexes. Constraint Index seems to vary somewhat with severity of operation (conversion). Therefore, it will be appreciated that it may be possible to so select test conditions to establish multiple constraint indexes for a particular given zeolite which may be both inside and outside the above defined range of 1 to 12.

Thus, it should be understood that the "Constraint Index" value as used herein is an inclusive rather than an exclusive value. That is, a zeolite when tested by any combination of conditions within the testing definition set forth herein above to have a constraint index of 1 to 12 is intended to be included in the instant catalyst definition regardless that the same identical zeolite tested under other defined conditions may give a constraint index value outside of 1 to 12.

The class of zeolites defined herein is exemplified by ZSM-5, ZSM-11, ZSM-12, ZSM-21, ZSM-35, ZSM-38 and other similar material. Recently issued U.S. Pat. No. 3,702,886 describing and claiming ZSM-5 is incorporated herein by reference.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

U.S. Application, Ser. No. 358,192, filed May 7, 1973, and now abandoned, the entire contents of which are incorporated herein by reference, describes a zeolite composition, and a method of making such, designated as ZSM-21 which is useful in this invention.

U.S. Application Ser. No. 528,061 filed Nov. 29, 1974, the entire contents of which are incorporated herein by reference, describes a zeolite composition including a method of making it. This composition is designated ZSM-35 and is useful in this invention.

U.S. Application Ser. No. 528,060, filed Nov. 29, 1974, and now abandoned, the entire contents of which are incorporated herein by reference, describes a zeolite composition including a method of making it. This composition is designated ZSM-38 and is useful in this invention.

The x-ray diffraction pattern of ZSM-21 appears to be generic to that of ZSM-35 and ZSM-38. Either or all of these zeolites is considered to be within the scope of this invention.

The specific zeolites described, when prepared in the presence of organic cations, are substantially catalytically inactive, possibly because the intracrystalline free space is occupied by organic cations from the forming solution. They may be activated by heating in an inert atmosphere at 1000° F for 1 hour, for example, followed by base exchange with ammonium salts followed by calcination at 1000° F in air. The presence of organic cations in the forming solution may not be absolutely essential to the formation of this special type zeolite; however, the presence of these cations does appear to favor the formation of this special type of zeolite. More generally, it is desirable to activate this type zeolite by base exchange with ammonium salts followed by calcination in air at about 1000° F for from about 15 minutes to about 24 hours.

Natural zeolites may sometimes be converted to this type zeolite by various activation procedures and other treatments such as base exchange, steaming, alumina extraction and calcination, alone or in combinations. Natural minerals which may be so treated include ferrierite, brewsterite, stilbite, dachiardite, epistilbite, heulandite and clinoptilolite. The preferred crystalline aluminosilicates are ZSM-5, ZSM-11, ZSM-12 and ZSM-21, with ZSM-5 particularly preferred.

The zeolites used as catalysts in this invention may be in the hydrogen form or they may be base exchanged or impregnated to contain ammonium or a metal cation complement. It is desirable to calcine the zeolite after base exchange. The metal cations that may be present include any of the cations of the metals of Groups I through VIII of the periodic table. However, in the case of Group IA metals, the cation content should in no case be so large as to substantially eliminate the activity of the zeolite for the catalysis being employed in the instant invention. For example, a completely sodium exchanged H-ZSM-5 appears to be largely inactive for shape selective conversions required in the present invention.

In a preferred aspect of this invention, the zeolites useful as catalysts herein are selected as those having a crystal framework density, in the dry hydrogen form, of not substantially below about 1.6 grams per cubic centimeter. It has been found that zeolites which satisfy all three of these criteria are most desired. Therefore, the preferred catalysts of this invention are those comprising zeolites having a constraint index as defined above of about 1 to 12, a silica to alumina ratio of at least about 12 and a dried crystal density of not substantially less than about 1.6 grams per cubic centimeter. The dry density for known structures may be calculated from the number of silicon plus aluminum atoms per 1000 cubic Angstroms, as given, e.g., on page 19 of the article on Zeolite Structure by W. M. Meier. This paper, the entire contents of which are incorporated herein by reference, is included in "Proceedings of the Conference on Molecular Sieves, London, April, 1967" published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal. It is possible that the unusual sustained activity and stability of this class of zeolites is associated with its high crystal anionic framework density of not less than about 1.6 grams per cubic centimeter. This high density of course must be associated with a relatively small amount of free space within the crystal, which might be expected to result in more stable structures. This free space, however, seems to be important as the locus of catalytic activity.

Crystal framework densities of some typical zeolites including some which are not within the purview of this invention are:

| Zeolite | Void Volume | Framework Density |
|---|---|---|
| Ferrierite | 0.28 cc/cc | 1.76 g/cc |
| Mordenite | .28 | 1.7 |
| ZSM-5, -11 | .29 | 1.79 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

FIG. I is a condensed, schematic, block flow arrangement of a known Fischer-Tropsch syngas conversion process directed to the conversion of coal to synthesis gas comprising carbon monoxide and hydrogen and the reduction of carbon monoxide by the Fischer-Tropsch Process to form a product mixture comprising hydrocarbon and oxygenates and the recovery of these products for further use.

FIG. II is a condensed schematic block flow arrangement for improving gaseous and normally liquid products boiling below 560° F and obtained by a Fischer-Tropsch Synthesis operation.

Referring now to FIG. 1, there is shown in block flow arrangement a substantially reduced process flow arrangement of the Sasol syngas conversion process. A coal gasifier section 2 is provided to which pulverized coal is introduced by conduit 4, steam by conduit 6 and oxygen by conduit 8. The products of gasifier section 2 are then passed by conduit 10 to a gas scrubber section 12. In scrubber section 12, carbon monoxide and hydrogen producing gases are separated from hydrogen sulfide which is removed by conduit 14, carbon dioxide removed by conduit 16, tars and phenols removed by conduit 18 and ammonia removed by conduit 20. The carbon monoxide-hydrogen producing gas is passed from section 12 by conduit 22 to a partial combustion zone 24 supplied with steam by conduit 26 and oxygen by conduit 28. Recycle $C_2$ fuel gas product of the combination process after separation of carbon dioxide therefrom is recycled by conduit 30 to the partial combustion section 24. In the partial combustion operation 24, a suitable carbon monoxide-hydrogen rich synthesis gas of desired ratio is formed for use in a downstream Fischer-Tropsch synthesis gas conversion operation.

The Sasol process operates two versions of the Fischer-Tropsch process; one being a fixed catalyst bed operation and the other being a fluid catalyst bed operation. Each of these operations use iron catalyst prepared and presented to obtain desired catalyst composition and activity. The synthesis gas prepared as above briefly identified is passed by conduit 32 to the Fischer-Tropsch reaction section 36 in admixture with recycle gas introduced at a temperature of about 160° C and at an elevated pressure of about 365 psig. The temperature of the synthesis gas admixed with catalyst in the fluid operation rapidly rises by the heat liberated so that the Fischer-Tropsch and water gas shift reactions take place. The products of the Fischer-Tropsch synthesis reaction are conveyed by conduit 38 to a primary cooling section 40 wherein the temperature of the mixture is reduced to within the range of 280° to about 400° F. In a primary cooling section a separation is made which permits the recovery of a slurry oil and catalyst stream by conduit 42, and a decant oil stream by conduit 44. In one typical operation, the decant oil stream will have an ASTM 95% boiling point of about 900° F. A light oil stream boiling below about 560° F and lower boiling components including oxygenates is passed by conduit 46 to a second or final cooling and separating section 48. In cooling section 48 a separation is made to recover a water phase comprising water soluble oxygenates and chemicals withdrawn by conduit 50, a relatively light hydrocarbon phase boiling below about 560° F withdrawn by conduit 52 and a normally vaporous phase withdrawn by conduit 54. A portion of the vaporous phase comprising unreacted carbon monoxide and hydrogen is recycled by conduit 34 to conduit 32 charging syngas to the Fischer-Tropsch synthesis operation. In a typical operation, about one volume of fresh feed is used with two volumes of recycle gas. The hydrocarbons do not completely condense and an absorber system is used for their recovery. Methane and $C_2$ hydrocarbons are blended with other components in a pipe line system or they are passed to a gas reforming section for recycle as feed gas in the synthesis operation. The light hydrocarbon phase in conduit 52 is then passed through a water wash section 56 provided with wash water by conduit 58. In wash section 56, water soluble materials comprising oxygenates are removed and withdrawn therefrom by conduit 60. The water phases in conduits 50 and 60 are combined and passed to a complicated and expensive to run chemicals recovery operation 62. The washed light hydrocarbon phase is removed by conduit 64 and passed to a clay treater 66 along with hydrocarbon fraction boiling below about 650° F recovered from the decanted oil phase in conduit 44 and a heavy oil product fraction recovered as hereinafter described. The hydrocarbon phase thus recovered and passed to this clay treating section is preheated to an elevated temperature of above about 600° F or higher before contacting the catalyst or clay in the treater. This clay treatment isomerizes hydrocarbons and particularly the alpha olefins in the product thereby imparting a higher octane rating to these materials. The treatment also operates to convert harmful acids and other oxygenates retained in the hydrocarbon phase after the water wash. The clay treated hydrocarbon product is passed by conduit 68 to a hydrocarbon separation reaction 70. A portion of the hydrocarbon vapors in conduit 54 not directly recycled to the Fischer-Tropsch conversion operation by conduit 34 is also passed to the hydrocarbon separation reaction 70. In the hydrocarbon separation section 70, a separation is made to recover a fuel gas stream comprising $C_2$ hydrocarbons withdrawn by conduit 72. A portion of this material is passed through a $CO_2$ scrubber 74 before recycle by conduit 30 to the partial combustion zone 24. A portion of the fuel gas may be withdrawn by conduit 76. In separation section 70, a $C_2$ olefin rich stream is recovered by conduit 78 for chemical processing as desired. A $C_3$ to $C_4$ hydrocarbon stream rich in olefins is withdrawn by conduit 80 and passed to catalytic polymerization in section 82. Polymerized material suitable for blending with gasoline product is withdrawn by conduit 84. A gasoline product fraction is recovered by conduit 86 and a light fuel oil product such as No. 2 fuel oil is withdrawn by conduit 88. The heavy ends from separation section 70 is withdrawn by conduit 90 for admixture with the decant oil fraction in conduit 44 as mentioned above. The blend of hydrocarbon product thus formed will boil in the range of about 400° F to about 1000° F. This material blend is passed to a separator section 92 wherein a separation is made to recover a fraction boiling in the range of from about 400° to 650° F withdrawn by conduit 94 from a heavier higher boiling waxy oil withdrawn by conduit 96.

In this relatively complicated synthesis gas conversion operation and product recovery, it is not unusual to recover a product distribution comprising 2% ethylene, 8% LPG, 70% gasoline boiling material, 3% fuel oil, 3% waxy oil and about 14% of materials defined as oxygenates.

This Fischer-Tropsch synthesis operation above briefly defined and known in the industry as the Sasol synthol process can be significantly improved following the concepts of this invention. That is the light oil phase obtained in the process and normally processed in the clay treating operation after a further water wash as above described can be significantly upgraded without the water wash step to gasoline and lower boiling product with high yields. Furthermore, the oxygenates retained in the light oil phase can be converted to products in a light fuel oil or gasoline boiling product thereby increasing the yield of $C_3$ and heavier material. Isobutane product of the crystalline zeolite conversion is preferably alkylated with $C_3$ to $C_4$ olefins produced. The $C_5$ and heavier material yield is thereby increased significantly. By following the processing concepts herein identified, the clear octane of the Fischer-Tropsch synthetic gasoline fraction or naphtha product is increased from 54 to 92 and the leaded octane number (R+3) goes from 69 to 99. The motor octane of the product is 83 clear and 89 leaded.

The gaseous phase recovered from the cooled Fischer-Tropsch synthesis product as by conduit 54 has been identified as comprising the materials listed in the following table.

TABLE 1

| | | |
|---|---|---|
| $N_2$, | mol% | 14 |
| $H_2$ | " | 30 |
| CO | " | 2 |
| $CO_2$ | " | 17 |
| $CH_4$ | " | 26 |
| $(C_2-C_4)$ | " | 9 |
| $C_5+$ | " | 2 |

The water phase recovered from the Fischer-Tropsch synthesis product has been identified in the literature as comprising a variety of materials. One identification of these materials is provided in the table below.

| ESTIMATED PRODUCTION OF ORGANIC CHEMICALS |
|---|
| Acetaldehyde |
| Propionaldehyde |
| N-BUtyraldehyde |
| Acetone |
| Methanol |
| Methyl ethyl ketone |
| Ethanol |
| n-Propyl alcohol |
| n-Butyl alcohol |
| n-Amyl alcohol |
| Acetic acid |
| Propionic |
| Butyric acid |
| Methyl propyl ketone |

It will be observed from the above table of organic chemicals that lower alcohols are produced and these materials exist in relatively large quantities. This it is contemplated in the combination operation of this invention of recovering all or a portion of the lower alcohols from the water phase and processing these recovered alcohols at least in part over the special zeolite catalysts herein identified to form gasoline boiling components in the gasoline boiling range along with gaseous hydrocarbon components upgraded as herein provided. Thus the lower alcohols recovered from the water phase may be processed with the $C_5$ rich gaseous material recovered in the process and contacted with the special zeolite catalyst, they may be separately processed or they may be processed over the special zeolite catalyst with the light oil phase.

In the embodiments represented by FIG. II the processing combination of FIG. 1 is extensively improved for upgrading hydrocarbons produced and particularly vaporous materials formed in the process and separated as in the final cooling section 48 and/or in the hydrocarbon separation section. The vaporous material separated from the final cooling section 48 has been identified as comprising the mixture represented in the table above.

The processing combination of the present invention is a highly versatile operation offering numerous product modifications to the refiner. For example a vaporous fraction separated in the final cooling section and comprising a mixture of hydrogen, carbon monoxide, methane, paraffins, olefins and oxygenates may be recycled in part to the Fischer-Tropsch synthesis reaction section 36 by conduit 34 or all of this vaporous material may be passed by conduit 114 as shown in FIG. II for admixture with the separated light oil fraction in conduit 100. The light oil fraction boiling in the range of $C_5$ - 500° F and comprising oxygenates is passed with or without vaporous material charged by conduit 114 through a heat exchanger 102 wherein it is heated to an elevated temperature of about 400° F before being passed by conduit 104 to heater 106 wherein the temperature of the light oil with or without vaporous material is raised to a temperature within the range of 500° F to 850° F. The preheated material is thereafter passed by conduits 108 and 94 to a reaction section 110 containing a special class of crystalline zeolites represented by ZSM-5 crystalline zeolites. Reaction section 110 is maintained at a temperature within the range of 500° F to about 950° F when treating the light oil phase alone and may be within the range of 500° F to 950° F when processing the vaporous material with the light oil stream. The reaction pressure may be kept within the range of 0 to 300 psig. In this embodiment it is to be understood that the final cooling of the Fischer-Tropsch effluent may be accomplished at a temperature within the range of 100° F to 150° F so that the material withdrawn as vaporous material may contain higher or smaller amounts of materials higher boiling than $C_2$ boiling hydrocarbons.

The product effluent of the special crystalline zeolites conversion operation is then passed by conduit 112 to heat exchanger 102 wherein it is partially cooled by giving up heat to the light oil charge passed through the heat exchanger. The partially cooled effluent is then passed by conduit 68 to a hydrocarbon separation section 70.

In the hydrocarbon separation section represented in the block flow arrangement by 70, the effluent of the combination operation is separated to recover a fuel gas removed by conduit 72 as in FIG. 1. A $C_2$ olefin stream removed by conduit 78, a stream comprising $C_3-C_4$ hydrocarbons removed by conduit 80, a gasoline stream removed by conduit 86, a fuel oil stream such as a No. 2 fuel oil removed by conduit 88 and a heavy oil stream removed by conduit 90. The processing combination of FIG. II lends itself to further significant improvement in the following respects.

In yet another embodiment it is contemplated processing the $C_2$ to $C_4$ hydrocarbons recovered in the operation by one of several different arrangements available in the process. For example in one arrangement, it is contemplated combining the $C_2$ olefins in conduit 78 with the $C_3-C_4$ hydrocarbons in conduit 80 and 116 in conduit 118 and charging this material into the light oil stream in conduit 104. On the other hand when the process of FIG. II is operated under conditions producing high yields of isobutane it is contemplated charging the appropriate light olefin stream such as recovered by conduit 78 and 80 to section 82 which has been modified to represent an alkylation process. Alkylate product of such a process may then be recovered by conduit 84 and mixed with the gasoline fraction recovered as by conduit 86. On the other hand it is contemplated recovering the $C_2$ olefin stream in conduit 78 as by conduit 120 or all or a portion of this stream alone may be passed by conduit 118 to conduit 104. In this latter arrangement, the $C_3$-$C_4$ fraction recovered as by conduit 80 may be processed in a polymerization or alkylation section represented by 82. In any of the arrangements or embodiments herein identified, it is proposed to upgrade the products of the prior art Fischer-Tropsch synthesis gas conversion operation comprising hydrocarbon and oxygenates over an unusual crystalline zeolite catalyst composition which converts oxygenates to hydrocarbons, cyclizes olefins, forms alkyl aromatics and converts undesired long chain hydrocarbons to form high octane products in the gasoline as well as to form light fuel oil boiling range materials.

In yet another embodiment it is contemplated passing a portion of the vaporous material in conduit 54 to a separate reaction zone 122 comprising the special crystalline zeolite herein described. In reaction zone 122 the operating conditions may be maintained at a temperature within the range of 500 to 800° F and a pressure within the range of 0 to 300 psig to particularly upgrade the olefin, paraffin and oxygenates in this vaporous stream passed thereto. Thus olefins charged and formed in the process may be oligomerized isomerized and/or cyclized to form aromatics. The effluent of reactor 122 is then passed by conduit 124 to the hydrocarbon recovery section 70.

In still another embodiment, it is contemplated passing the mixture comprising $C_2$ to $C_4$ hydrocarbons in conduit 118 and obtained from conduits 78 and 80 through a separate crystalline zeolite upgrading conversion operation similar to reaction section 122 or this stream may be processed in reactor 122 alone or along with vaporous material passed thereto by conduit 54. For example the material in conduit 118 may be passed to reactor 122 by conduit 126 rather than furnace 106. Means not shown will be provided for diverting the various process streams as herein provided and providing heat thereto as required to maintain desired processing reaction conditions. Therefore for purposes of simplifying the processing arrangement various valves, pumps and heat providing means have not been included.

The improvements realized when processing in accordance with the improved method of this invention may be more completely appreciated by reference to the following specific data. Table 2 identifies a product yield obtained when processing a light oil charge identified in the table over the special crystalline zeolite catalyst identified herein as ZSM-5 crystalline zeolite.

TABLE 2

| SYNTHOL LIGHT OIL YIELDS (WT %) | | |
|---|---|---|
| | Light Oil Charge | Total Product |
| CO, $CO_2$, $H_2$ | — | 0.1 |
| Water | — | 2.1 |
| Coke | — | 0.3 |
| Light Gas ($C_1$ + $C_2$) | — | 0.3 |
| Propane | .05 | 2.3 |
| Propylene | .23 | 1.4 |
| n-Butane | .20 | 2.6 |
| i-Butane | .02 | 5.5 |
| Butenes | 1.40 | 4.1 |
| $C_5$-425° F | 73.20 | 68.2 |

TABLE 2-continued

| SYNTHOL LIGHT OIL YIELDS (WT %) | | |
|---|---|---|
| | Light Oil Charge | Total Product |
| 425° F and Heavier | 24.90 | 13.1 |
| Total | 100.00 | 100.0 |
| Octane No. (R+0) | | |
| Gasoline (C5-425° F) | — | 92 |

The properties of the raw hydrocarbon liquid product as obtained from reactor 110 of FIG. II are summarized in Table 3. As shown in Table 2, a gasoline fraction with an octane number of 92 (R+O) is separated from the product.

TABLE 3

| SYNTHOL LIGHT OIL PROCESSING DATA | | |
|---|---|---|
| | Light Oil Charge | Raw Liquid Product |
| Oxygen, % wt | 1.7 | 0.1 |
| Acid No., mg KOH/gm | 4.95 | 0.05 |
| Molecular weight | 151 | 124 |
| Specific Gravity | .7665 | .7655 |
| Odor | Poor | Much Improved |
| Octane Number | | |
| R+0 | 54.0 | 92.7 |
| R+3 | 69.2 | 99.4 |
| M+0 | — | 92.6 |
| M+3 | — | 89.8 |
| ASTM Distillation, ° F | | |
| 5% | 146 | 100 |
| 10 | 173 | 116 |
| 20 | 214 | 151 |
| 30 | 248 | 188 |
| 50 | 314 | 263 |
| 70 | 396 | 335 |
| 80 | 432 | 389 |
| 90 | 482 | 489 |
| 95 | 527 | 580 |

The process described in FIG. 1 and herein identified as a block flow arrangement of the Sasol process, upgrades the synthol light oil stream after water wash to remove oxygenates by treating with an alumina silicate catalyst as in a clay treater. The estimated product yields and octane number of the gasoline fraction obtained by that process are given in Table 4. Corresponding data directed to the improved processing concept of this invention which eliminates the water wash are also given in Table 4 for comparison. It will be noted that the $C_3$+ yield of the improved process of this invention represented by FIG. II is substantially higher than that obtained by the Sasol process. Also the octane number of the gasoline product fraction is substantially higher than a similar fraction obtained from the Sasol process.

TABLE 4

| PRODUCT YIELDS AND OCTANE NUMBER COMPARISON | | |
|---|---|---|
| | Improved Process | Sasol Process (estimated) |
| $C^3$+ | 97 | 90 |
| $C^5$+ | 81 | 83 |
| $C^5$+, Alkylate, or poly Gasoline | 92 | 89 |
| $C^5$+ - 425 F, Alkylate, or poly Gasoline | 79 | 79 |
| R+0 Octane | 92 | 75 |

Having thus generally described the improved method and process of the present invention and provided some specific examples in support thereof, it is to be understood that no undue restrictions are to be imposed by reason thereof except as defined by the following claims.

We claim:

1. A method for upgrading products of Fischer-Tropsch synthesis which comprises, separating the product effluent of Fischer-Tropsch after cooling to recover a synthetic water phase comprising oxygenates, a normally liquid hydrocarbon light oil phase boiling below about 560° F comprising oxygenates and a normally gaseous phase rich in $C_5$ hydrocarbons in combination with lower boiling gaseous materials, passing the normally liquid hydrocarbon light oil phase boiling below about 560° F without further water washing in contact with a selective crystalline aluminosilicate zeolite that has a pore diameter greater than about 5 Angstroms; a silica-to-alumina ratio of at least 12; a constraint index within the range of 1 to 12; under conversion conditions selected to increase the octane rating of a gasoline product separated therefrom in combination with gaseous components suitable for alkylation, passing the products obtained from said normally liquid hydrocarbon light oil conversion operation to product separation, passing the total synthesis gaseous phase rich in $C_5$ hydrocarbons and comprising a mixture of carbon monoxide, methane, paraffins, olefins and oxygenates in contact with a selective crystalline aluminosilicate zeolite that has a pore diameter greater than about 5 Angstrom units; a silica-to-alumina ratio of at least 12; and a constraint index within the range of 1 to 12 under conversion conditions selected for upgrading hydrocarbon components of said gaseous phase to gasoline boiling compounds and gaseous hydrocarbons suitable for alkylation, passing the products obtained from said gaseous phase conversion operation to product separation, separating the products of said catalytic conversion operations to recover gasoline boiling product of improved octane rating, a light fuel oil product higher boiling than said gasoline fraction, a $C_3$–$C_4$ net fraction suitable for alkylation and a stream comprising $C_2$ and lower boiling hydrocarbons.

2. The method of claim 1 wherein oxygenates in the water phase are recovered to separate lower alcohols therefrom and separated lower alcohols are passed in contact with said special crystalline zeolite catalyst to form aromatics.

3. The method of claim 1 wherein a product shown rich in $C_3$–$C_4$ hydrocarbons is passed to either one or both of said crystalline zeolite conversion operations.

4. The method of claim 1 wherein oxygenates retained in the light oil phase are converted to hydrocarbons during contact with said crystalline zeolite conversion catalyst.

5. The method of claim 1 wherein $C_5$ minus gaseous material separated from the synthesis product effluent is recombined with the light oil phase and processed as a combined stream over said crystalline zeolite conversion catalyst.

6. The method of claim 1 wherein the light oil phase separated from the cooling zone is heated to a temperature above 500° F before passing in contact with said crystalline zeolite conversion catalyst.

* * * * *